C. W. HUDSON.
MILK PAIL COVER.
APPLICATION FILED JAN. 25, 1913.
1,062,650.
Patented May 27, 1913.
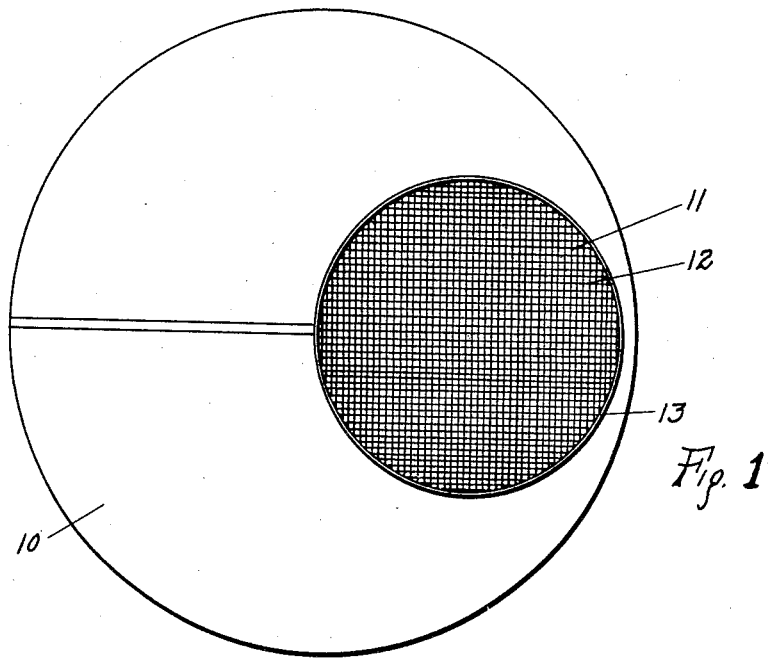
Fig. 1
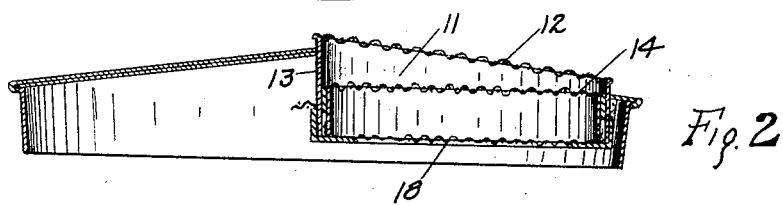
Fig. 2
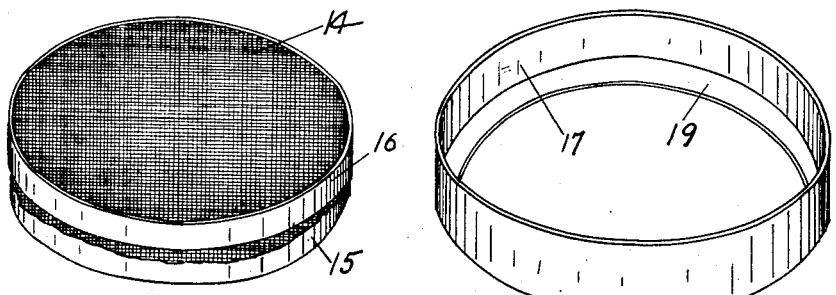
Fig. 3
Fig. 4
Witnesses
Inventor
Charles William Hudson
By
Herbert E. Smith
Attorney

UNITED STATES PATENT OFFICE.

CHARLES W. HUDSON, OF RIVERSIDE, WASHINGTON.

MILK-PAIL COVER.

1,062,650.  Specification of Letters Patent.  Patented May 27, 1913.

Application filed January 25, 1913. Serial No. 744,109.

*To all whom it may concern:*

Be it known that I, CHARLES W. HUDSON, citizen of the United States, residing at Riverside, in the county of Spokane and State of Washington, have invented certain new and useful Improvements in Milk-Pail Covers, of which the following is a specification.

This invention relates to milk pails and has for its object to provide an improved cover or top for such pails, having an opening therein and means for disposing of a plurality of straining elements in the milk receiving opening of said cover.

A further object of the invention is to provide a means for effectually preventing entrance of dirt or other foreign matter into the cover opening, a means for causing the larger particles of dirt or straw, that may drop to roll off the cover, thus maintain the contents of the pail in a sanitary condition while milking, and thereby conducing to health and cleanliness.

A further object of the invention is to provide a cover for milk pails, having an eccentrically located opening, said cover sloping downwardly from the top of the opening to the periphery of the cover and said opening being disposed to lie closely to the lid but slightly raised, the diametrical dimension being angularly disposed with relation to the sloping or inclined wall, and a reticulated metallic fabric arranged to cover said opening flush with the edges thereof.

A still further object of this invention is to provide a cover for milk pails, having a cover opening with a wire screen flush with said opening and disposed at an angle with the horizontal, to provide for the removal of dirt or straw too large to pass through the mesh of the screen, said opening forming a well to receive a gauze straining device, and said straining device being positioned substantially horizontal with the bottom of the pail.

A still further object of the invention is to provide a cover for milk pails, having an eccentrically located opening therein and provided with a wire screen to act as an arrest and distributer for the force of the stream of milk entering, preventing the splashing of the milk upon the second screen.

A still further object of the invention is to generally improve and increase the efficiency of devices of this character and to produce a cover for milk pails having easily accessible means to the several parts for cleaning same and keeping them in a sanitary condition, and one which is very strong and durable in construction and may be manufactured at a comparatively small cost.

For a full understanding of the invention, reference is to be had to the following description and accompanying drawings, in which—

Figure 1 is a top plan view of a top or cover embodying thereon the present invention; Fig. 2 is a cross section in elevation through the cover; Fig. 3 is a perspective of the inner or second gauze straining device, showing it stretched and positioned upon the supporting rings; Fig. 4 is a perspective of the retainer for the bottom straining cloth.

Referring in detail to the drawings, 10 designates a milk pail cover somewhat higher at the center than at the circumference; 11 is a strainer opening supporting a wire gauze strainer 12 flush with its upper edges, said opening constituting a well with sides 13 and its top edge slightly raised above the cover. Directly beneath gauze 12 and lying horizontal with the plane of the cover is disposed a gauze first strainer 14 which is tightly stretched across the opening and supported by rings 15 and 16, the ring 15 being a sufficient width to regulate and fix the position of the gauze 14, and being retained therein by retainer ring 17 which fits over the well walls 13 and retains a muslin or closely woven fabric 18 which does the final straining. The well 11, which is constructed with the side walls 13, supports the wire mesh 12 flush with its upper edges and slightly raised above the cover and at an angle to allow matter falling upon it to be readily displaced. The bottom of the well is substantially parallel with the plane of the cover, the well walls being secured to the cover by means of solder or other suitable securing means. The ring 17 which serves to retain the inner or central straining device is provided with an inwardly extending horizontal flange 19 upon which the bottom of the ring 15 rests. The strainer 14 is cut circular and slightly larger than the ring 15 over which it is drawn and the banding member 16 positioned. 16 stretches and retains 14 tightly over the ring 15.

From the above construction it will be apparent that, as a metallic straining fabric is disposed at an angle that relates to the axis of the pail, the milk stream will strike squarely thereon and be divided, thus decreasing the force of the entering flow which strikes upon the screen 14 and preventing the splashing thereon; and all danger of loss due to such splashing will be obviated.

It will, of course, be apparent that the several straining cloths which I employ may quickly and easily be removed and be thoroughly cleaned or replaced by new ones. It will also be obvious that while I have described the preferred construction and arrangements of the various parts, the invention is susceptible of considerable modification without departing from the spirit of the invention or sacrificing any of the advantages thereof.

The wire gauze or first straining device will prevent the rapid dissolving of caked dirt or foreign substances that may fall upon it, owing to its not retaining any considerable amount of the fluid, as would be the case in using cloth or fabric of a similar nature. Thus it more readily provides for the removal of the dirt that is too large to pass through, at the same time prevents flies or other germ carrying insects from coming in contact with the damp surface of the straining cloths and disposing germs upon the cloth, germs that may be carried to the milk with the pail.

Having thus described my invention, I claim:

1. A milk pail cover having a shallow conical body wall, the apex of which is eccentrically located, the short inclined side of said body wall being provided with an opening supporting a band and forming a well, said band being slightly raised above the cover member and supporting flush with its upper edges a metallic strainer device, an annular body band supporting a straining element and a somewhat larger band for retaining the straining element tightly across the body band, a ring with an inwardly extending horizontal flange somewhat larger than the side walls of the well and provided to retain the inner straining device within the casing to support a final straining device across the bottom of the well.

2. A milk pail cover having a shallow conical body wall, the apex of which is eccentrically located, the short inclined side of said body wall being provided with an opening, a strainer arranged within said opening, said strainer consisting of a metallic body band secured to the cover wall and having one of its ends disposed flush with the outer surface of said wall, a reticulated metallic straining fabric secured to said end of the band over said opening, a straining cloth located intermediate of the ends of the band within the same, a clamping band arranged in the body band to hold said cloth in position, a second straining cloth, and an annulus frictionally engaging upon the inner end of said body band, to hold the latter straining cloth in position, said annulus being of angular form in cross section and having an inwardly extending flange constituting a stop to prevent inward movement of said clamping band.

3. A milk pail cover having a shallow conical body wall, the apex of which is eccentrically located, the short inclined side of said body wall being provided with an opening or well, said well extending upwardly and terminating at a slight distance above the cover and supporting on its upper edges a metallic straining device disposed flush with the edges and disposed slanting to the horizontal, a well supporting a plurality of cloth straining devices horizontal and in spaced relation to each other.

In testimony whereof I affix my signature in presence of two witnesses.

CHARLES W. HUDSON.

Witnesses:
 HAROLD E. SCANTLEBURY,
 PAUL B. WARREN.

---

Copies of this patent may be obtained for five cents each, by addressing the "Commissioner of Patents, Washington, D. C."